(12) United States Patent
Bouchard et al.

(10) Patent No.: US 7,265,665 B2
(45) Date of Patent: Sep. 4, 2007

(54) VEHICLE PROXIMITY ALARM SYSTEM AND METHOD

(75) Inventors: Michel Bouchard, St-Charles Borromée (CA); Jacques Audet, Brossard (CA); Alain Bergeron, Pierrefonds (CA)

(73) Assignee: RFAD Inc., Sherbrooke, Québec (CA)

( * ) Notice: Subject to any disclaimer, the term of this patent is extended or adjusted under 35 U.S.C. 154(b) by 584 days.

(21) Appl. No.: 10/792,711

(22) Filed: Mar. 5, 2004

(65) Prior Publication Data

US 2004/0217869 A1    Nov. 4, 2004

Related U.S. Application Data

(60) Provisional application No. 60/547,427, filed on Feb. 26, 2004.

(51) Int. Cl.
*G08B 1/08* (2006.01)
(52) U.S. Cl. .............................. 340/539.11; 340/539.13
(58) Field of Classification Search ............. 340/539.1, 340/990, 539.11, 991, 539.13, 988, 989
See application file for complete search history.

(56) References Cited

U.S. PATENT DOCUMENTS

| | | |
|---|---|---|
| 3,626,411 A | 12/1971 | Litchford |
| 3,673,560 A | 6/1972 | Barsh et al. |
| 3,806,936 A | 4/1974 | Koster |
| 4,030,088 A | 6/1977 | McCullough |
| 4,438,429 A | 3/1984 | Park |
| 4,792,796 A * | 12/1988 | Bradshaw et al. ...... 340/539.21 |
| 5,021,765 A | 6/1991 | Morgan |
| 5,298,883 A | 3/1994 | Pilney et al. |
| 5,307,060 A | 4/1994 | Prevulsky et al. |
| 5,388,047 A | 2/1995 | Ryan et al. |
| 5,828,306 A * | 10/1998 | Curran .................... 340/573.4 |
| 5,959,551 A | 9/1999 | Cardillo |

(Continued)

FOREIGN PATENT DOCUMENTS

EP        0 638 878        12/1995

(Continued)

*Primary Examiner*—Brent A. Swarthout
(74) *Attorney, Agent, or Firm*—Bereskin & Parr

(57) ABSTRACT

An object of the present invention is to provide a method of proximity detection based on transmitting at random intervals burst of a RF signal at a power level, and receiving, while not transmitting, a received RF signal. When detecting said received RF signal emitted by a target in range; an alarm signal is provided to warn of the proximity of the target. Another broad aspect of the invention is to deploy the above method among members of a territory and provide a monitoring patrol to verify if the proximity of those members can be detected from their RF signal. Another broad aspect of the invention is to provide to those members a plurality of status from which each member selects one corresponding to its current status and to transmit that status in the RF signal he is transmitting, thereby informing other members in range of his current status and enabling them to evaluate the potential danger associated with him.

39 Claims, 7 Drawing Sheets

U.S. PATENT DOCUMENTS

| | | |
|---|---|---|
| 6,081,187 A | 6/2000 | Akutsu |
| 6,163,277 A | 12/2000 | Gehlot |
| 6,239,700 B1 * | 5/2001 | Hoffman et al. ....... 340/539.13 |
| 6,249,232 B1 | 6/2001 | Tamura et al. |
| 6,484,021 B1 | 11/2002 | Hereford et al. |
| 6,606,033 B1 | 8/2003 | Crocker et al. |
| 6,614,387 B1 | 9/2003 | Deadman |
| 6,630,891 B1 | 10/2003 | Dilling |
| 2002/0084904 A1 * | 7/2002 | De La Huerga ......... 340/573.1 |
| 2002/0145522 A1 | 10/2002 | Pembroke |
| 2003/0011478 A1 | 1/2003 | Rabanne et al. |
| 2003/0038451 A1 | 2/2003 | Bouchard |

FOREIGN PATENT DOCUMENTS

| | | |
|---|---|---|
| FR | 2 761 501 | 10/1998 |
| WO | WO00/79502 | 12/2000 |
| WO | WO02/050796 | 6/2002 |
| WO | WO02/50797 | 6/2002 |
| WO | WO03/056528 | 7/2003 |

* cited by examiner

VEHICLE PROXIMITY ALARM SYSTEM AND METHOD

CROSS-REFERENCE TO RELATED APPLICATIONS

This application claims priority of U.S. provisional application, Ser. No. 60/547,427, filed on Feb. 26, 2004.

FIELD OF THE INVENTION

The present invention relates to the general field of safety and is particularly concerned with a vehicle proximity alarm system.

BACKGROUND OF THE INVENTION

In recent years, an increased number of vehicles combined with increased driving speeds have been giving rise to a concurrent increase in the number of collision accidents. Such accidents each year result in a relatively large number of fatalities and injuries and cause significant property damage.

As is well known, collisions may occur as a result of numerous factors including operator inattentiveness, incompetence, errors in judgment, and so forth. Typically, operator reaction time also plays a part in determining whether a potential collision, once detected, can be avoided.

Accordingly, one potential method for reducing the number of accidents is to allow vehicle drivers to be apprised of the presence of another vehicle and it is in more or less general vicinity. Various situations exist wherein the need to be informed of the presence of another vehicle is particularly crucial. Examples of such situations include atmospheric conditions such as fog, smog, rain, snow, or the like. Other examples include terrain or road conditions such as rough or mountainous terrain, curves, dips or crests, intersections, or the like. Lighting conditions ranging from well-lit highways in clear weather to unlit back roads in foul weather are further examples of situations wherein the knowledge of the presence of another vehicle, within the predetermined range, may become crucial.

Heretofore, it has been a customary practice by drivers of various types of vehicles to attempt to view the area in the vicinity of the vehicle by way of one or more mirrors mounted on the interior or exterior of the vehicle or, alternatively, for drivers to turn their heads to visually observe a particular area. As will be recognized, the various interior and exterior mounted mirrors of the vehicle typically yield a selective area in the vicinity of the vehicle commonly referred to as a blind spot which cannot be properly observed, thereby rendering a driving manoeuvre dangerous while the turning of the driver's head to visually observe the desired area requires the drivers to be momentarily inattentive to the vicinity in front of the vehicle. Thus, these two alternatives for observing the selected areas in the vicinity of the vehicle prior to making a driving manoeuvre have proven less than ideal and usually have posed a significant safety hazard to the driver of the vehicle or adjacent vehicles.

The prior art has shown some examples of systems and devices for detecting the presence of other vehicles. However, most of these systems or devices suffer from numerous drawbacks. For example, some of these systems have a marked directionality requiring precise alignment between vehicles. Also, some prior art devices and systems have limited effectiveness when used for measuring distances of less than a few hundred meters.

Accordingly, there exists a need for an improved vehicle proximity alarm system, that would be inexpensive, robust and that would be efficient in a variety of weather, lighting, road and field conditions, where several obstacles may be found. There is also a need for a vehicle alarm system that would not only alert someone of the presence of someone else in the immediate neighborhood, but would indicate if that presence is at long or short range and furthermore, would give indications about the nature or the status of the presence. Finally there is a need for such systems to be deployed among travelers that can be vehicles or pedestrians, and be installed on obstacles of a territory, in order to increase the safety of the territory and to provide to those travelers the possibility of traveling without concerns of having a collision with another traveler until being warned with the vehicle alarm system of his presence. It is therefore a general object of the present invention to provide such an improved vehicle proximity alarm system.

SUMMARY OF THE INVENTION

Accordingly, an object of the present invention is to provide a method of proximity detection based on transmitting at random intervals burst of a RF signal at a power level, and receiving, while not transmitting, a received RF signal, detecting said received RF signal emitted by a target when in range; and providing an alarm signal to warn of the proximity of said target.

In accordance with second broad aspect of the invention, there is provided a method of improving the safety of a group of members in a territory, the method comprising the steps of providing to each member a transmitter and a receiver to transmit and receive an RF signal, wherein said RF signal comprises information on the status of the member, and providing a plurality of statuses among which the member selects one that corresponds to his status, such that each member can inform other members of its presence in a pre-determined range and of its status, and can be informed of a proximity and of the status of other members by detecting the RF signal emitted by other members located in said range; and then providing to each member an alarm signal as a function of the status transmitted by another member in said range and as a function of the proximity, enabling each member to evaluate from the alarm signal the potential danger associated with another member.

In accordance with a third broad aspect of the invention, there is provided a method of improving the safety of a group of members in a territory, the method comprising the steps of providing to each member a transmitter and a receiver to transmit and receive an RF signal such that each member can inform other members of its presence in a pre-determined range, and can be informed of the presence of other members by detecting the RF signal emitted by other members located in the range, the receiver further providing an alarm signal to warn of said presence; then observing the members in the territory and determining if the alarm signal has been provided for the observed members; and when the alarm has not been provided, notifying the observed members of failure to receive the RF signal, therefore increasing the safety level of the group of members within the territory.

Advantageously, in the above-described broad aspects of the invention, the alarm signal is provided when members are in a range typically greater than twice the stopping distance it takes a member to stop when urged to stop, therefore reducing the risks of collisions between members in the territory.

Also advantageously, the RF signal is an omni-directional signal so that the member can inform others of its presence equally in all directions and be informed of a presence in range in all directions.

Also advantageously, the transmitter and the receiver are grouped in a vehicle proximity alarm system unit (VPASU) which also includes a device to display, among other things, the alarm signal. Preferably, this display comprises several LEDs.

Also advantageously, the RF signal is transmitted at random intervals and alternately at different power levels corresponding to different signal ranges.

Desirably, the above transmitted signal, when detected by another VPASU at proximity, is assessed in order to determine if the proximity corresponds to longer ranges or to shorter ranges. This information is also preferably displayed on the VPASU to inform the VPASU user of the approximate distance of the detected presence.

Also preferably, the RF signal is a frequency modulated RF signal in which is encoded information. This encoded information can comprise for example information identifying the transmitter such as a serial code. The encoded information can also comprise information about the status of the transmitter, such as for example an emergency status. The encoded information can also comprise information about the power level at which the signal is transmitted. Preferably, all the above information is used to inform the VPASU user about the nature, the status and the distance of a detected presence at proximity. Also preferably, the above information is displayed on the VPASU.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
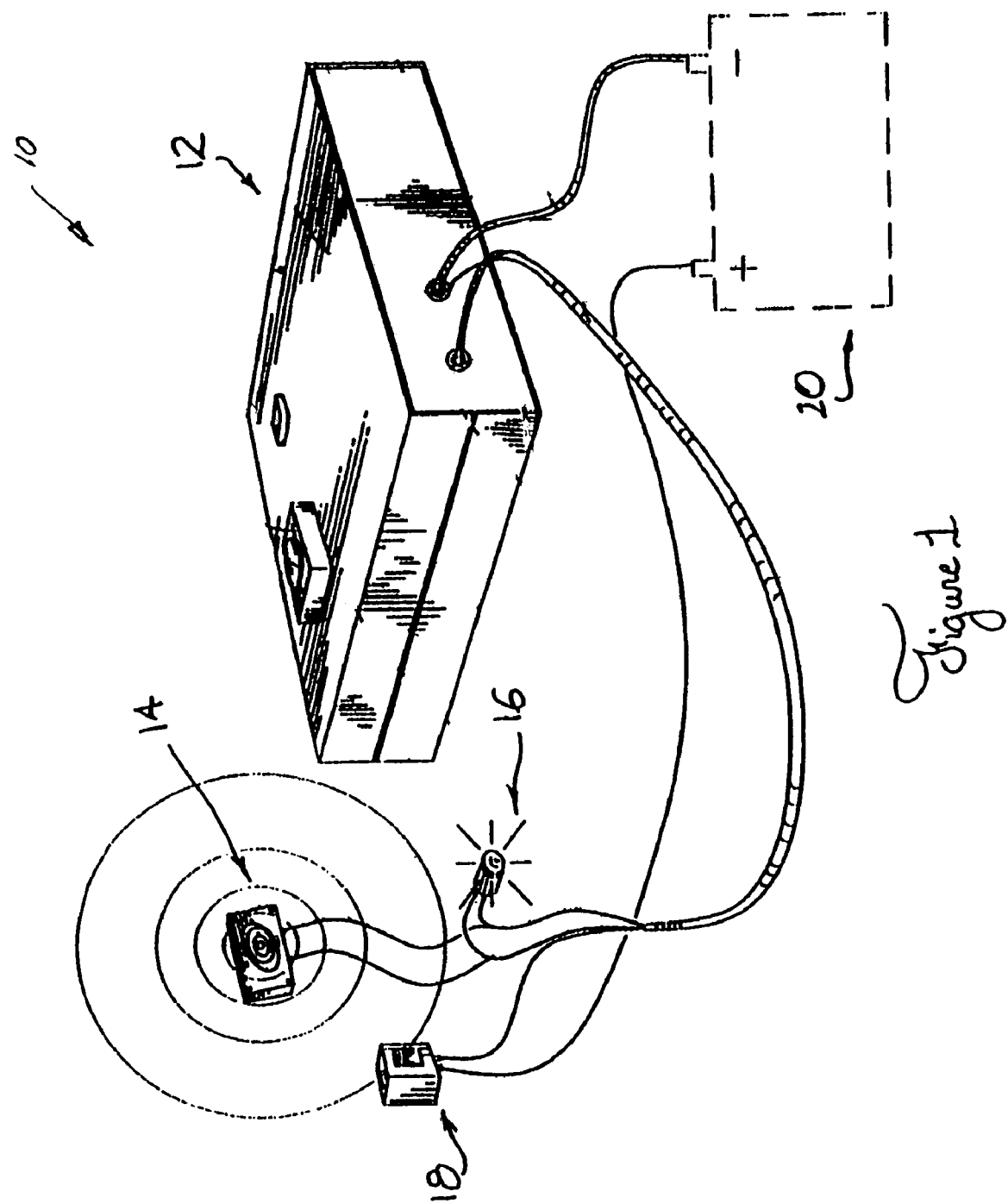
FIG. 1 is a perspective view illustrating a vehicle proximity alarm system unit (VPASU) in accordance with a first embodiment of the present invention.

The proximity alarm system, in accordance with the present invention is based on a vehicle proximity alarm system unit (VPASU) 10, the VPASU 10 being distributed to vehicles, pedestrians, patrols or obstacles of a territory, to improve safety of the territory.

In one embodiment of the present invention, each member of a snowmobile club receives a VPASU 10 and a patrol monitors the territory to verify that all the members announce their presence to others with their VPASU 10. In a second embodiment of the present invention, workers of a forestry plant, including truckers and loggers are equipped with a VPASU 10 so that they can inform others of their presence as well as of their status such as if the truck is loaded or not, and so on.

The VPASU 10 is the common denominator to both embodiments. It includes emitting means for emitting a signal at a predetermined signal frequency and a receiving means for receiving the signal. The VPASU 10 also includes an activating means for selectively activating either the emitting means or the receiving means. Typically, the activating means activates the emitting means so that the latter emits the signal during a relatively short emitting period at random time intervals. Once the signal has been emitted the activating means activates the receiving means until it randomly reactivates the emitting means.

Each VPASU 10 further includes informing means coupled to the receiving means for informing an intended user that the receiving means has received the signal having predetermined signal characteristics. The informing means may take any suitable form including visual and/or audio signaling components.

When a VPASU 10 is mounted and activated in at least two vehicles positioned within a predetermined operational distance from one another the receiving means of each VPASU 10 will receive the signal emitted from the VPASU 10 of another vehicle and, hence, inform their respective users that another vehicle having a similar alarm system is located within the predetermined operational area. Intended vehicle operators are hence provided with a visual, tactile such as vibration for example, audio or other type of alert to the fact that the presence of another vehicle may constitute a potential safely threat.

Typically, although by no means exclusively, the operational signal frequency is chosen among the allowed frequencies in the RF spectrum since such signals are typically able to travel through various types of obstacles. The frequency can be chosen in the range of 900 MHz since empirical and experimental data seems to have demonstrated that this particular frequency is optimal in rough terrain for an operational range between 0 and 500 meters depending on the type of antennae being used.

Also, preferably, the signal is emitted during a relatively short emitting period so as to minimize the time period during which the receiving means is inactivated. Furthermore, the signal is preferably emitted randomly so as to reduce the risks of having the emitting cycle of two vehicles within a given operational range synchronize relative to each other and, hence, rendering their respective alarm system mutually inefficient.

In the preferred embodiment, all the VPASU's 10 have a receiver sensitivity that is equal. Preferably, the signal strength of the received signal is not evaluated, but detection above a certain threshold is used. Also, preferably, the VPASU's 10 use same circuitry.

When two vehicles, each of them equipped with a VPASU 10, are in range, they will be notified of the presence of another vehicle by the alarm signal that each VPASU 10 will provide. Therefore the two vehicles are aware of the presence of another vehicle and can therefore adjust accordingly their behavior to avoid collisions. The safety of the territory is thus improved.

When installed into a vehicle, the emitting and receiving means of the VPASU 10 can be powered by the battery of the vehicle. The VPASU 10 could naturally be powered by an independent battery. Power is typically provided to the emitting and receiving means as asynchronized pulses insuring that when the emitting means emits a signal the receiving means is inactivated in order to avoid that an alarm system of a given vehicle be activated by its own emitting means.

Referring to FIG. 1, there is shown a VPASU unit 10 in accordance with the present invention. The VPASU 10 typically includes the protective casing 12 attachable to a vehicle (not shown) using suitable fixing means. The protective casing 12 is typically designed so as to protect internal components mounted therein against environmental elements including moisture, dust and the like.

Preferably, the protective casing 12 is either provided with or mounted on shock absorbing means in order to reduce the risks of having vibration or impacts damage some of the internal components. The sealing means used for sealing the internal components from the external environment and the damping or shock absorbing means will depend on the type of context in which the VPASU 10 is to be used. It should be understood that the VPASU 10 although initially intended to be mounted on recreational vehicles such as snowmobiles, moto-marine vehicles, all-terrain vehicles and the like, could be used on any other types of vehicles including land, water or air vehicles without departing from the scope of the present invention. Naturally, the VPASU 10 unit could also be offered in a very compact size such in a pager style which could be more appropriate particularly for pedestrians.

The alarming means may take any suitable form including audio means 14 such as buzzers, horns or the like, visual indicating means 16 such as light emitting diodes, neon lights, panel displays or the like. Optionally, the alarming means may further include tactile indicating means (not shown) such as vibration means mounted adjacent to the seat and/or steering wheel of the vehicle. Optionally, a means, such as the emergency switch 18 shown in FIG.1 may be provided for allowing an intended user to inform others of its sate of emergency.

Another switch, not shown on FIG. 1 may also be provided, as it will be described in more details later on in this disclosure, which allows the VPASU user to select a status that corresponds to his situation and that he wants to communicate to other vehicle or pedestrians that are in proximity.

Description of the VPASU Unit

The VPASU comprises an RF transmitter module (TX) 41 (used as emitting means), an RF receiver module (RX) 42 (used as a receiving means) and a RF antenna 44 to transmit the signal from the TX and receive an RF signal. It also comprises a micro-controller 59 to control its functions and a visual alarm display to alarm the VPASU 10 user of the proximity of a presence equipped with a similar VPASU 10.

As mentioned earlier, one of the features of the VPASU 10, according to the preferred embodiment, is that the transmission is done during short periods of time, and reception is performed between transmission periods. This TX/RX sequence is essentially random with the goal of reducing the risks of having two VPASU 10 being totally synchronized and therefore being undetectable to the other. In one embodiment of the present invention, the transmission window is about 20 ms, and the time interval between two consecutive transmission windows can vary from 75 ms to 300 ms.

It will be obvious for one skilled in the art that other timing schemes and sequences could also be used including schemes that are not random.

It will also be obvious for someone skilled in the art, that the reception could be performed in continuous manner even during the transmission periods.

Another feature of the VPASU 10, according to the preferred embodiment, is to transmit and receive omni-directionally the RF signal. However, it is also possible to choose an antenna pattern in order to transmit and or receive in a preferred direction.

Figure 2:
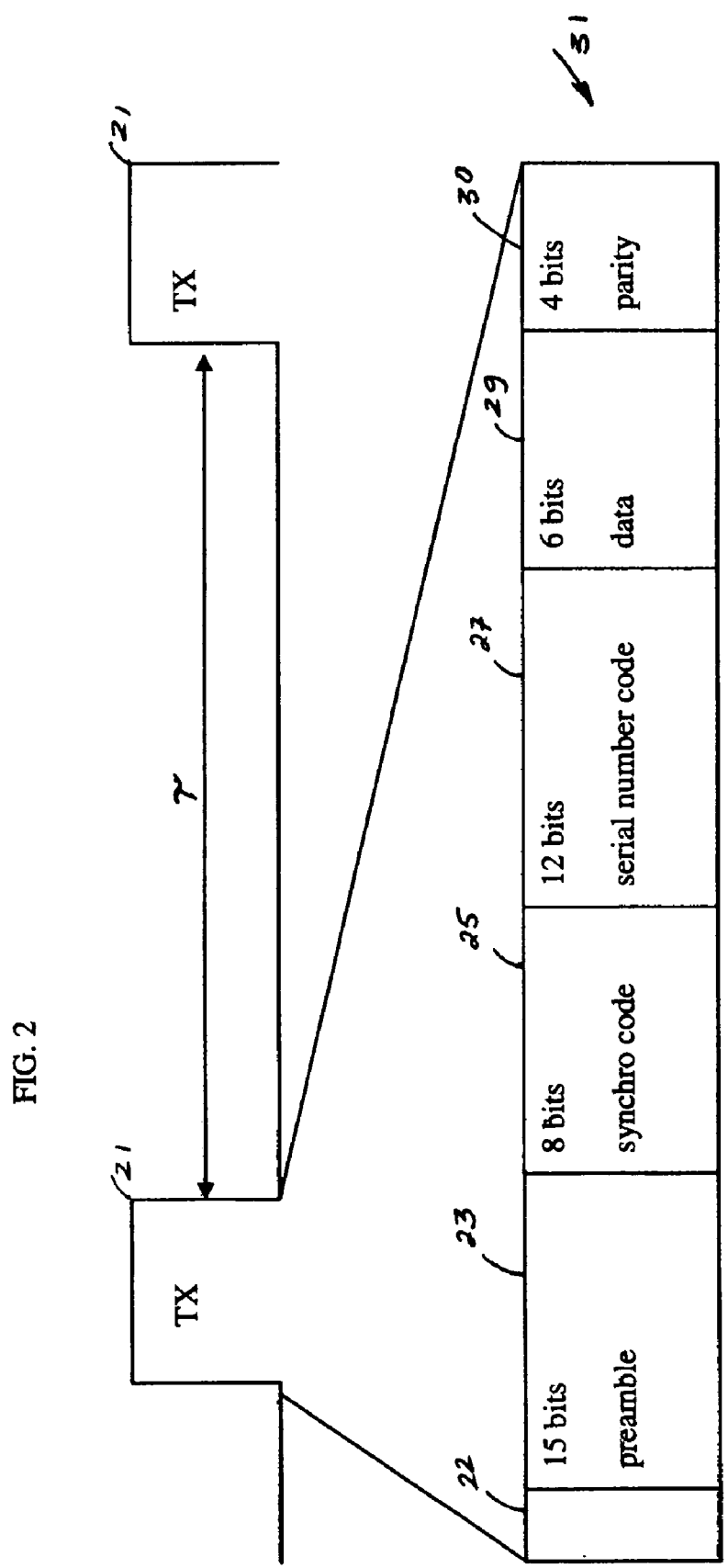
FIG. 2 is a schematic illustration of the structure of the data frame in the RF signal transmission in accordance with the first embodiment of the present invention.

In one embodiment of the present invention, the RF signal sent by the antenna 44 is frequency modulated to transmit information about the signal sender. This information follows a data frame structure 31 that is shown in FIG. 2. FIG. 2 illustrates, first of all, two transmitted RF bursts 21 that are separated by a variable time delay $\tau$ (that changes randomly between two consecutive transmitted bursts) and illustrates, secondly, an enlarged portion of one TX burst 21 showing the frame contents. In this embodiment the data frame includes a synchronization code 25, a serial number code 27, a data sequence 29, and a parity code 30. The synchronization code 25 is used to inform a receiver of the arrival of the following data. The serial number code 27 is, as the name says, a code identifying the emitter, which in some situations can be very important information to provide. Then follows 6 bits of data 29 in which, according to this embodiment, transmits information about the status of the sender or about its transmitting/receiving operation status. Finally, 4 bits of parity 30 completes the RF transmitted burst, which are used as a mean to verify the integrity of the received signal.

The data code 29 according to this embodiment can take 4 different values. In normal mode 37, the VPASU 10 transmits RF bursts alternatively at low power and at high power. At the highest power level, the data code is D1 and for the following RF burst, at lower power, the data code is D2. The third data code, D3, serves to identify a transmission from an object or any presence that is operating in the beacon mode 38. As it will be described later on, in the beacon mode 38, the VPASU 10 is only transmitting. Then the data code can also be D4, which corresponds to the emergency code, in which case the RF signal when received is decoded as an emergency signal.

It is therefore possible, by decoding the above information to get information about the nature of the transmitter, its identity, and its status.

Figure 3:
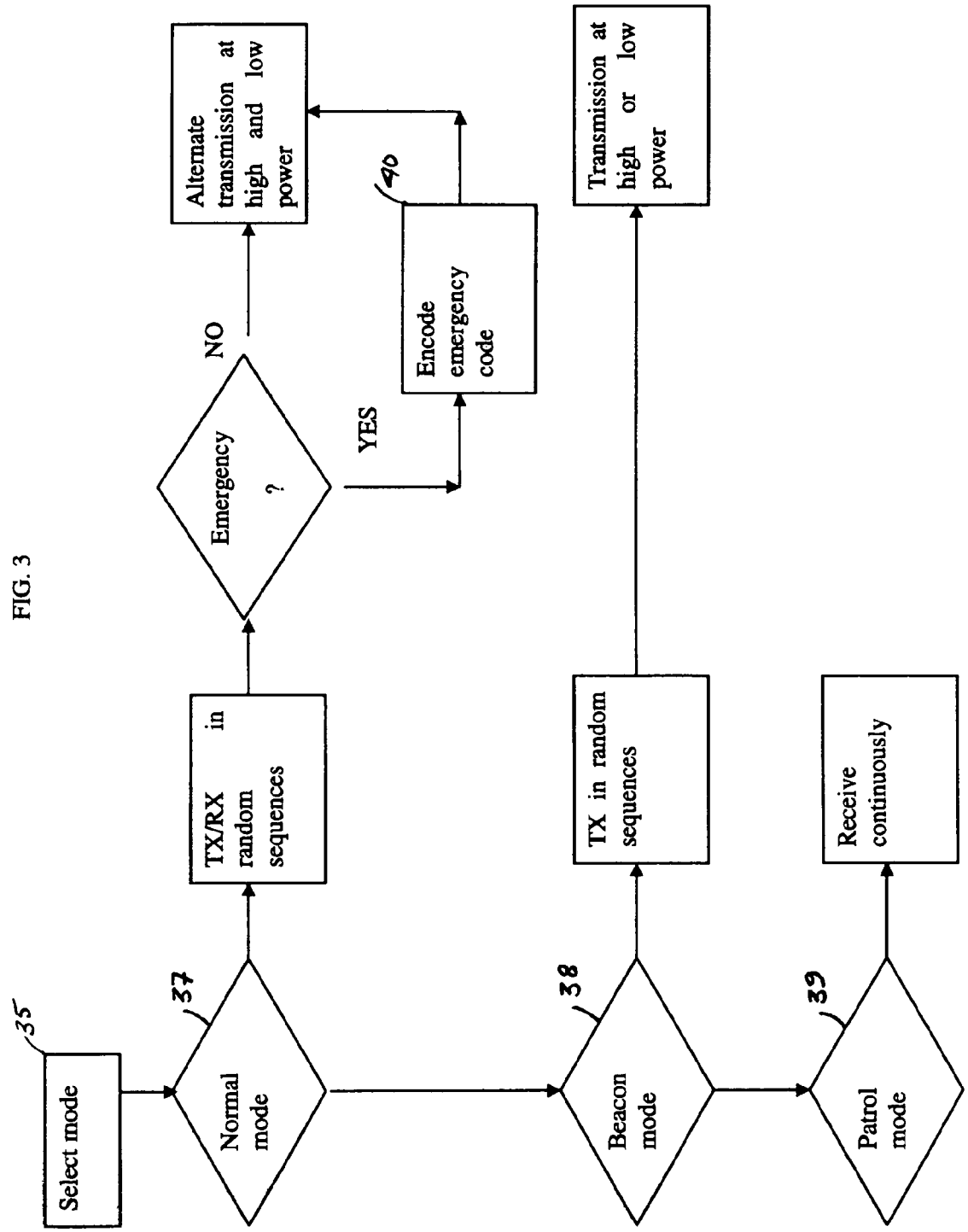
FIG. 3 is a flow chart describing the transmission for various operation modes of the vehicle proximity alarm system unit (VPASU) in accordance with the first embodiment of the present invention.

FIG. 3 is a flow chart illustrating the transmission for various operation modes of the VPASU 10. In one of the embodiment, the VPASU 10 comprises a switch to select 35 the mode at which the VPASU 10 will be operating. In this embodiment, there are three modes that can be selected: the normal mode 37, the beacon mode 38, or the patrol mode 39.

In the preferred embodiment, the normal mode 37, as mentioned earlier, consists in transmitting alternatively at higher and lower power levels. Both power levels are adjusted to correspond, when detected by another VPASU 10, to a long (LR) or short (SR) range. Depending for what application the VPASU 10 are used, these levels are thus tuned for the desire range.

Figure 4:
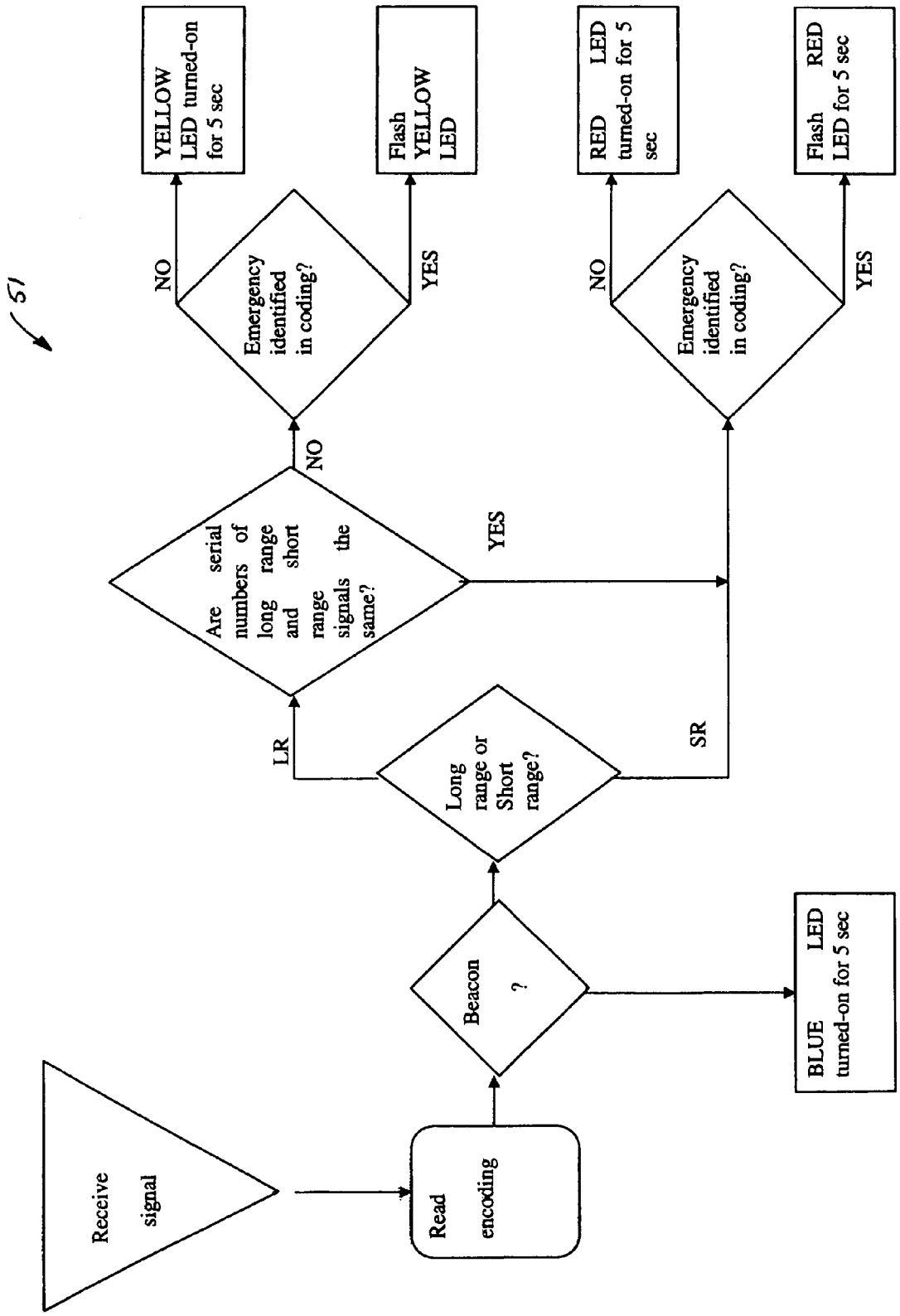
FIG. 4 is a flow chart of the display algorithm of the vehicle proximity alarm system unit (VPASU) in accordance with the first embodiment of the present invention.

Therefore, when a receiving VPASU 10 is detecting an RF signal emitted by another VPASU 10 at a distance corresponding to the long range and does not detect its following RF signal at lower power, the receiving VPASU 10, via an algorithm 51 described in FIG. 4, can conclude that the emitting VPASU 10 is at long range. Preferably, the LR signal is further encoded with a LR status and the SR signal is encoded with a SR status, enabling a receiving VPASU 10 to acknowledge from the code the range of the received signal.

Naturally, as it will be obvious for someone skilled in the art, it is also possible to transmit at more than two power levels, therefore providing the VPASU 10 user the possibility of being informed with a better range resolution of the presence of someone.

In the beacon mode 38, the VPASU 10 is set to only transmit in random sequences the RF bursts. The purpose of this mode of operation is to provide information about the presence of obstacles or objects of a territory by equipping those obstacles or objects with VPASU 10 operating in that mode. As shown in FIG. 3, the power level of the transmitted signal can be adjusted to a high or low level depending on the range at which this obstacle is aimed to be detected.

In the patrol mode, the VPASU 10 is receiving continuously. The purpose of this mode is to provide the possibility to patrol a territory without informing other of the patrolling presence. As it will be described later on, this mode has application when the safety level of a territory is to be increased.

When operating in normal mode and in case of emergency, it is also possible to encode the emergency status 40 of the data code 29. When the signal will be received and decoded via the algorithm 51, the receiving VPASU will be therefore informed of the presence of a user in danger.

FIG. 4 illustrates the algorithm 51 of the VPASU 10 according to one embodiment of the invention. The algorithm begins when the signal is received. First of all, the transmitted frame structure 31 is read and the signal encoding is read. Then if the data code 29 has been set to correspond to the beacon mode 38, a blue LED 49 of the VPASU display used as the visual indicating means 16 is lighted up for five seconds. If the data code 29 does not correspond to the beacon mode 38, then the next step of the algorithm 51 is to verify if the signal has been encoded as a high or as a low power level. If the signal is encoded as high power level, a long range (LR) status is associated to it, whereas for a low power level code a short range (SR) status is associated. The next step is to then check if two consecutive RF signals, a LR signal and a SR signal, are emitted by the same VPASU, in which case we know that the corresponding presence is at short range. When the presence is at short range, the red LED 47 of the VPASU display used as the visual indicating means 16 is lighted up for five seconds. When the presence is at long range, the yellow LED 48 of the VPASU display used as the visual indicating means 16 is lighted up for five seconds.

The algorithm 51, according to this embodiment, also checks if the data code 29 has been set to the emergency code. If it is the case, then the yellow LED 48 or the red LED 47, depending if the signal is associated to a LR or a SR, flashes for 5 seconds.

Thus, according to the above described embodiment, a driver of a vehicle equipped with a VPASU 10 will be informed of the presence of dangerous obstacle on the road located at a certain distance by seeing on the display used as the visual indicating means 16 the blue LED 49 lighted up for 5 seconds or as long as the signal from the obstacle is received.

Also, in the event that another vehicle equipped with the same VPASU happens to be at close range (SR), the red LED 47 will be on for 5 seconds, or as long as the other vehicle stays in close range, which will alert the driver of this presence. And, as mentioned earlier, if said red LED 47 is flashing, it means that that presence is in danger and may require immediate help. Thus the VPASU 10 is a very convenient tool to localize in a pre-determined range a driver in danger.

Although in the preferred embodiment we do not use the advantages of the GPS, a GPS could be used as a substitute. Instead of using signal strength to determine range with or without a code, one could always broadcast with maximum power one GPS coordinates from which the received VPASU 10 will determine range.

Figure 5:
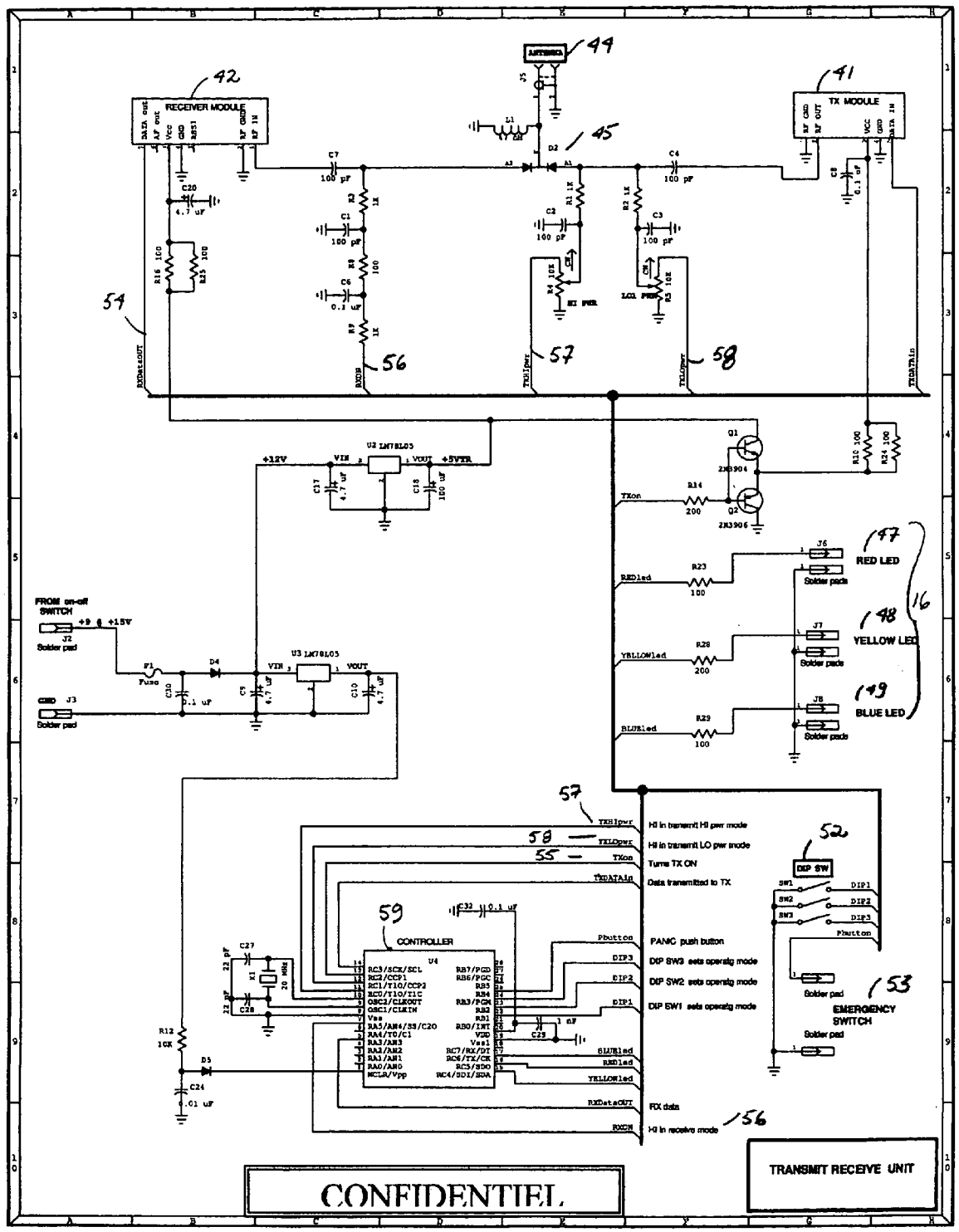
FIG. 5 is a schematic of the electrical circuit of the vehicle proximity alarm system unit (VPASU) in accordance with the first embodiment of the invention.

We will now describe FIG. 5 which is a schematic of the electrical circuit of the VPASU 10 according to the first embodiment just described.

The VPASU 10 comprises an RF transmitter module (TX) 41 (#FM9TX from Abacom), an RF receiver module (RX) 42 (#FM9RX from Abacom) and a RF antenna 44 to transmit the signal from the TX and receive an RF signal. The antenna 44 is of a Quarter Wavelength antenna (ANT-916-PW-RA-ND) to provide for an omni-dimensional emission pattern. The unit uses self contained transmit and receive modules which operate at the same frequency in the UHF band.

In a preferred embodiment, the RF signal is transmitted omni-directionally, so that any receiver within a pre-determined range will receive the signal. However, the antenna could also transmit in a directional manner so that only receivers aligned in the direction of the transmitted pattern could receive the signal. This could be advantageous implemented, for example, in the case of road signaling panels where one direction is particularly favored. In the same manner, the antenna could receive in a directional manner so that only transmitted signal aligned in the direction of the receiving pattern would be detected. This last could be advantageously be implemented for patrols that could this way limit the field of detection of a vehicle at range.

The indication means 16 to alarm the VPASU user of the proximity of a presence equipped with a similar VPASU, comprises three LED, a red 47, yellow 48 and blue 49. Depending on the nature of the signal received, these LEDs are powered up by the micro-controller 59 (PIC 16F876 from Micro-Chip) which controls and drives those LEDs.

An assembly of dual pin diodes, the diodes A1 and A2, serves as a TX/RX switch 45. In the receive mode, the diode A2 is turned on via a bias current supplied by the "RXON" line 56 from the microcontroller 59. When this line goes to +5V, the diode bias current flows into resistors R9, R8 and R3, then into the diode A2, and into L1 inductor which provides DC return to ground. Capacitor C7 blocks DC voltages from the RX module 42. In the transmit mode, diode A2 is turned off by setting the "RXON" line 56 to 0V, to prevent feeding the transmitted signal into the receiver 42. This way a VPASU 10 user does not detect its own presence.

In the transmit mode either "TXHlpwr" line 57 or "TXLOpwr" line 58 will go to +5V to bias pin diode A1, via R4 and R1 in high power mode or via R5 and R2 in low power mode. Potentiometers R4 and R5 provide for continuous adjustment of the high and low output power levels. Accordingly, the TX module 41 will emit a high power or a low power RF signal for long or short range detection. Capacitor C4 blocks DC voltages from the TX module 41.

Thus according to this embodiment, the dual diodes A1 and A2 are alternately forward biased such that the VPASU 10 alternately receives and transmits. The receiver 42 is always on, and during the transmit periods, it monitors the integrity of the transmitted signals, via the microcontroller which monitors the decoded receiver output line "RXdataOUT" 54. In the event of a malfunction, the microcontroller will blink all LEDs 47, 48, 49 continuously to indicate that the unit is defective. The transmitter 41 is turned on by the microcontroller 59 "TXon" line 55 which goes to +5V. Transistors Q1 and Q2 acts as buffers to quickly charge/discharge the TX module 41 power input line.

The received signals are fed to the microcontroller 59 where they are decoded. After being decoded by the microcontroller 59, they get displayed by the three LED diodes: red 47, yellow 48 and blue 49. The series resistors R23, R28 and R29 act as current limiting resistors.

DIP switches 52 SW1, SW2, SW3 are read by the microcontroller at power-up to determine in which mode (normal 37, beacon 38 or patrol 39) the VPASU 10 is operating. When any of these switches is open, the microcontroller will read a high level or +5V as supplied by internal pull-up resistors. When the switch is closed the microcontroller reads a 0V level. Depending on which switch has been activated, the transmitted signal will be encoded with the corresponding data code 29. The emergency switch 53 is also read so that if that switch was activated by the VPASU user, the transmitted signal will be accordingly encoded.

The microcontroller clock comes from a 20 MHz crystal X1 which forms a resonator with capacitors C27 and C28. The microcontroller reset circuit uses R12, C24 and diode D5. The +12V power input comes from the unit on-off switch and goes to fuse F1. Capacitor C30, C9 and C17 filter the noise on the 12V line while diode D4 prevents damage due to polarity reversals. Voltage regulators U2 and U3 provide the regulated +5V supplies for the unit. Capacitors C10 and C18 filter the +5V supplies.

As it will be obvious for someone skilled in the art, the visual indicating means 16 of the VPASU 10 could have other configuration without departing from the scope of the present invention. It can also comprise a display to display the serial number code 27 of the emitter, so that the emitter at range can be identified. The VPASU 10 can also provide for a plurality of switches 52, each indicating a particular information, so that the VPASU 10 user can, by activating a particular switch, provide for additional information about its status or nature.

It will also be obvious to someone skilled in the art, that the VPASU 10 could provide for a precise indication of the position of a detected presence if it were using for example a GPS signal. This position information could in turn be displayed as an additional information.

Deploying VPASU in a ATV Recreational Area

Figure 6:
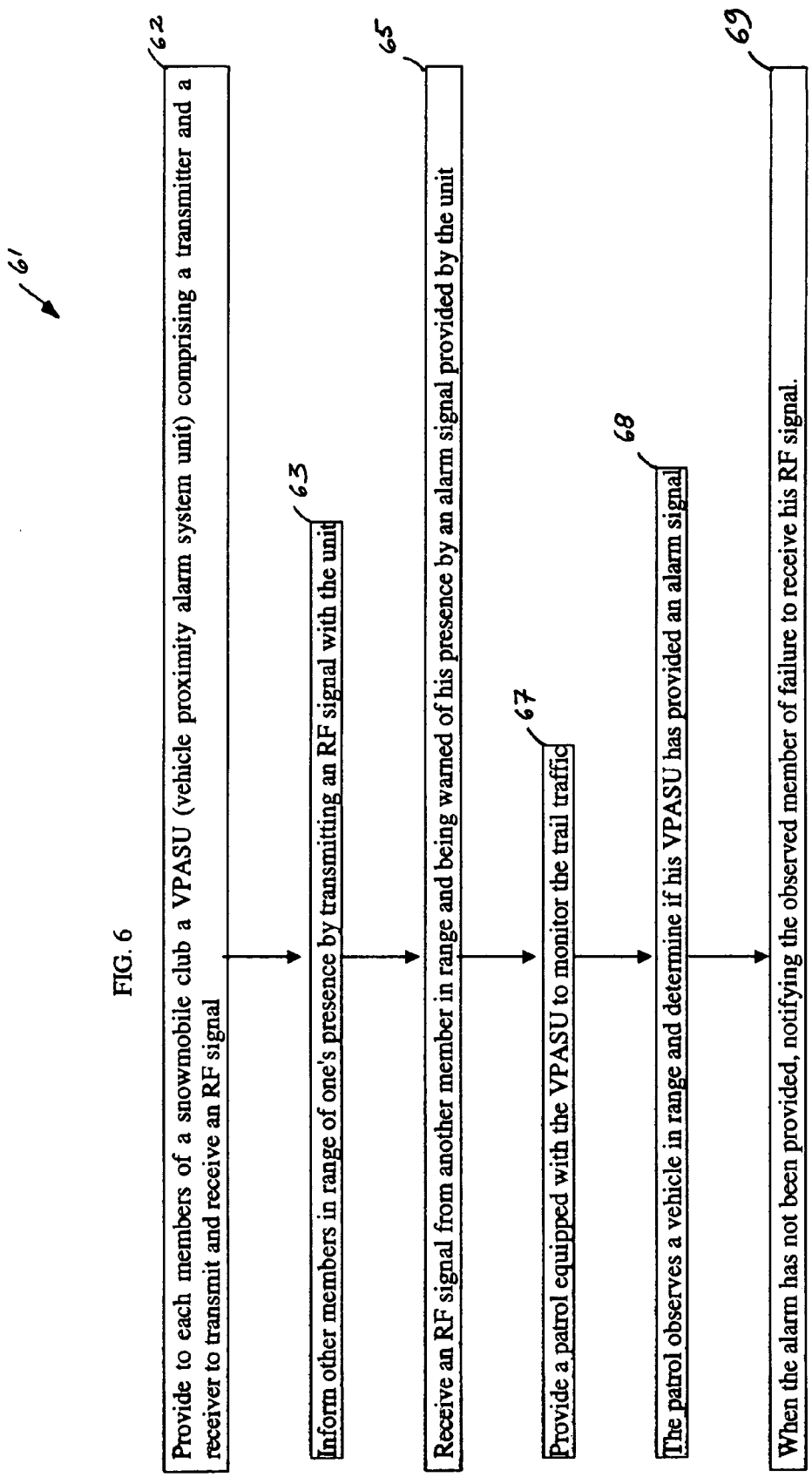
FIG. 6 is a flow chart of a vehicle proximity alarm method deployed within a snowmobile club in accordance with a second embodiment of the present invention.

Turning now to FIG. 6, we will describe a vehicle proximity alarm method of improving the safety of a group of snowmobile club members 61, each of them having in their snowmobile a VPASU 10, 62.

With their VPASU active, each member is transmitting and receiving alternatively an RF signal. Therefore a member can inform another member in range of his presence 63. Preferably, the short range and long range are chosen to be about 100 meters and 700 meters, and the low and high power levels of the transmitted RF signal are set accordingly in the VPASU 10. Naturally, other ranges can be chosen. The above ranges were selected considering the speed at which the vehicles typically travel and the typical time it takes to a member in those conditions to react to the sudden knowledge that another vehicle is in close range. It will be obvious for someone skilled in the art that other ranges can be selected depending on the situation.

A member when in range of another member will thus be informed of his presence by the visual indicating means 16 of his VPASU 10, 65, even if there is no visual contact between them. If the other member is within a distance of 700 meters, than the yellow LED 48 will be on for 5 seconds. If the other member is traveling toward him, then the red LED 47 will turn on and the yellow LED will turn off, indicating that the other member is approaching. The member can thus react to this situation and avoid a collision with other snowmobiles.

In the method 61, a snowmobile patrol equipped with the VPASU 10 is also provided 67. The patrol monitors the recreational area in order to ensure that all the club members are using a VPASU 10. Preferably, the patrol will select the patrol mode 39, in which case the other members cannot be alert of his presence since the patrol does not transmit an RF signal. When a patrol detects the presence of a snowmobile, referred as to the observed vehicle, the patrol checks if his VPASU 10 has provided an alarm signal 68. If the alarm has been provided, it means that the snowmobile is a member of the club and that his VPASU 10 is working well. Otherwise, the patrol will notify the observed vehicle that something is wrong 69, either that the vehicle is not one of the club or that his VPASU is dysfunctional. Appropriate measures can then be taken such as for example expulsing the non-member, or provide him a VPASU 10. With this method, members of the territory are assured that their recreational area is safer.

It will be obvious for someone skilled in the art that instead of having a snowmobile patrol, the territory may by observed and monitored by an assembly of detectors such as for example movement detectors coupled to the VPASU 10 set in patrol mode 39 and to a control station to which information about a vehicle in fault is conveyed.

It will also be obvious to someone skilled in the art that the above method can be applied in various situations such as ATV recreational area, forestry area, boating club, etc.

Deploying VPASU in a Forestry Territory

Figure 7:
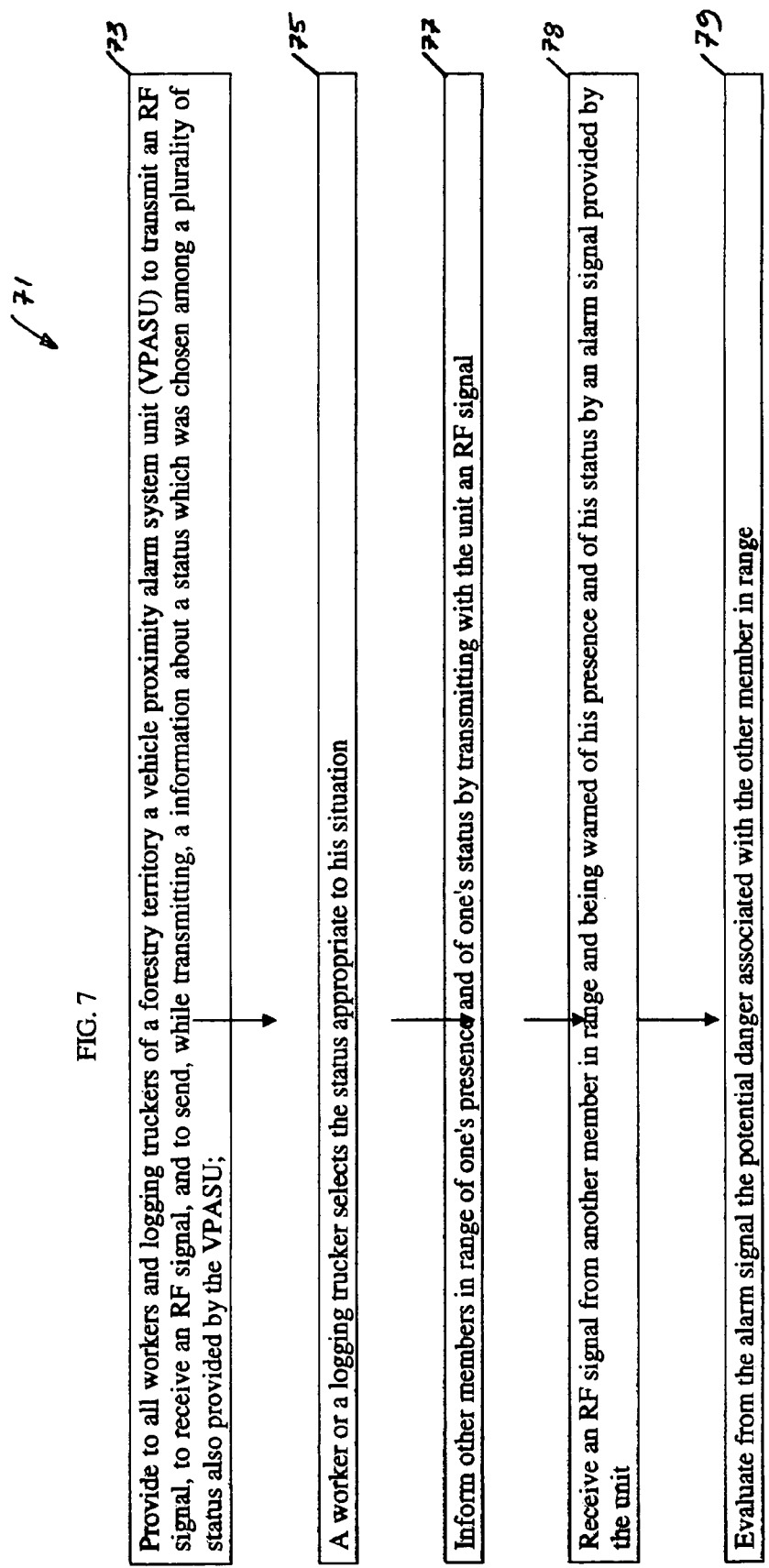
FIG. 7 is a flow chart of a vehicle proximity alarm method deployed in a forestry operation in accordance with a third embodiment of the present invention.

Turning now to FIG. 7, we will describe another method of improving the safety of a group of persons on a territory 71, the territory being this time a forestry area in which travel logging trucks and other forestry workers.

The method consists in providing to all the workers and the logging truckers a VPASU 10, so that they can transmit an RF signal, receive an RF signal, and send, while transmitting, a information about a status which was chosen among a plurality of statuses also provided by the VPASU 10,73. The status can be an emergency code, or another information such as for example, indicating that a truck is fully loaded or not. These statuses can be selected from a switch 53' on the VPASU 10, similar to the emergency switch 53 already described. Once the status as been selected 75, the transmitted RF signal is encoded accordingly with a technique similar to the one described in FIG.2.

A worker or a logging trucker can inform another worker or logging trucker in range of his presence and of his status by transmitting with the VPASU 10 an RF signal 77. The other worker (or logging trucker) will then be warned of the presence and of the status of the transmitter 78. He will then be in a good situation to evaluate the potential danger of this presence in range 79, and will react and take actions accordingly. For example, it will take to a traveling loaded logging truck a very long distance to completely stop, and therefore other workers around should be inform of this situation in order to increase their safety.

In another embodiment, switch 53' is used to select a danger status to identify a danger within a restricted range, such as in the case where a lumberjack is about to cut down a tree. The lumberjack can select, via the switch 53', the status corresponding to the fact that the area where he is working is potentially dangerous. Other receiving that signal can attempt to identify by earring or by sight the presence of the lumberjack and take necessary actions to maintain safe distance.

Naturally, one possible status that can be selected is the emergency status. If for example, a worker was injured, he can activate this status and his VPASU 10 will transmit in the RF signal an emergency code 40. Another worker in range will thus be alerted that a worker is in danger to be able to help him.

Obviously, in the two methods just described, various objects or obstacles found on the territories may be equipped with VPASU 10 set in the beacon mode 38, so that said workers and vehicles, can be alerted of their presence. Examples of such objects are dangerous road turns, bridges, signalization panels, etc, and other types of objects that are found in each particular situation were these methods are used.

Obviously, the VPASU 10 can be adapted to the particularities of a specific territory. For example, VPASU 10 units could be installed during winter on the frozen lakes of a snowmobiles club territory, and those VPASU 10 would operate in the beacon mode 38 to inform the club members of the presence of the lake. Advantageously, the signal sent by the lake would be encoded with a status code informing members in range if it is safe or not for them to pass on the lake or not. This status could be adjusted using switch 53' by, for example, a patrolling member of the club, that would check if the ice covering the lake is thick enough to be safe. Accordingly, when the member in range of the lake receives the beacon signal from the lake, he is also informed if it is dangerous or not to cross the lake.

In some territories, it may be advantageous to patrol the territory to installed, when needed, a VPASU 10 in the beacon mode to inform others of a potential danger. Potential dangers can be trees about to fall, dangerous road conditions following a snow storm or heavy rain, etc. That way the security of the territory is improved.

Naturally, it is possible to create in a territory a chain of beacons that will relay information from one beacon to another until the information reaches a control station. This beacon chain can be very useful to relay an emergency signal sent by a vehicle in need of immediate help. With that kind of relay chain, a beacon equipped with a VPASU 10 and in range of the vehicle will receive its emergency signal. The beacon will then relay this signal to the nearest beacon by transmitting a encoded signal and said nearest beacon will itself transmit the same encoded signal to the next beacon, and so on, until the emergency signal rapidly reaches the control station.

Here is another example where the VPASU 10 has been adapted to the specific needs of territory where an higher level of security is needed. In an ATV recreational club, the drivers that are known to be dangerous for going too fast, get special VPASU 10 that are relayed to their ATV driving system and that can limit the speed of the vehicle upon the reception of a special encoded RF signal. Such encoded signal can be transmitted by the VPASU 10 of another member of the club who found that the ATV driver was going too fast or by a patrol member verifying that all the members are respecting the speed limits of the territory. Obviously, those special VPASU 10 could advantageously be used in other types of recreational clubs such as snowmobile clubs, boating clubs, etc.

In some circumstances it may be advantageous to equipped a vehicle with two VPASU 10 units: one that stays in the vehicle and one portable version that can be easily transported by the driver. As long as the two VPASU 10 are in range, they stay in communication via their RF transmitting/receiving signals. But if, for some reasons, they get separated by a distance exceeding their range of reception, the communication link is cut. If the VPASU 10 are configured to activate an alarm signal when this link is broken, then a driver may be informed that his vehicle is no longer in range. A direct application of this dual VPASU 10 system is to use it as an alarm system to inform a driver that his vehicle is about to be stolen.

It will also be obvious to someone skilled in the art, that the above methods can be applied in various situations and are therefore not limited to the special cases just described. For example, these methods could advantageously be implemented in mining field, in military zones, storage area, airport areas, and in any recreational areas such as boating areas, ATV fields, etc. That list is not meant to be exhaustive and is given just as possible applications of the methods.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method of improving the safety of a group of members in a territory, the method comprising:
   providing to each member a transmitter and a receiver to transmit and receive an RF signal such that each member can inform other members of its presence in a pre-determined range, and can be informed of the presence of other members by detecting the RF signal emitted by other members located in the range, the receiver further providing an alarm signal to warn of said presence;
   observing the members in the territory and determining if the alarm signal has been provided for the observed members; and
   when the alarm has not been provided, notifying the observed members of failure to receive the RF signal, therefore increasing the safety level of the group of members within the territory.

2. The method as claimed in claim 1, wherein said increasing the safety level of the territory comprises reducing the risks of collisions between members in the territory by providing the alarm when members are in a range typically greater than twice the stopping distance of a member urged to stop.

3. The method as claimed in claim 1, wherein said members comprise mobile vehicles.

4. The method as claimed in claim 1, wherein said members comprise pedestrians.

5. The method as claimed in claim 1, wherein said RF signal comprises an omni-directional RF signal.

6. The method as claimed in claim 1, wherein said RF signal comprises an essentially continuous signal.

7. The method as claimed in claim 1, wherein transmit and receive a RF signal comprises transmitting at random intervals bursts of the RF signal and receiving while not transmitting, therefore transmit and receive alternately said RF signal in a pseudo-random pattern.

8. The method as claimed in claim 1, wherein said alarm signal comprises an audio signal.

9. The method as claimed in claim 1, wherein said alarm signal comprises a visual signal.

10. The method as claimed in claim 1, wherein said observing and determining comprises having a member of said group patrolling the territory.

11. The method as claimed in claim 10, wherein said member of said group patrolling said territory is only receiving said RF signal.

12. The method as claimed in claim 1, wherein said observing and determining comprises detecting the movement of the members with a device, located on said territory, wherein said devices comprises a movement detector and the receiver to receive the RF signal.

13. The method as claimed in claim 1, wherein said observing and determining comprises detecting the members with a device, located on said territory, wherein said device comprises a camera and the receiver to receive the RF signal.

14. The method as claimed in claim 1, wherein said observing and determining further comprises determining if said observed members are moving with a speed within admissible limits.

15. The method as claimed in claim 1, wherein said notifying comprises sending a RF alert signal that can be detected with said means to receive.

16. The method as claimed in claim 1 further informing a member of the range of another member, by:
establishing the range by evaluating, after detecting, the RF signal emitted by said another member,
displaying the range value to said member.

17. The method as claimed in claim 16, wherein said establishing the range by evaluating, after detecting, the RF signal emitted by said another member comprises:
detecting the power level of the RF signal emitted by said another member;
comparing said power level to a known value corresponding to the power level of said signal at the transmitter, and establishing from said comparison the range separating members.

18. The method as claimed in claim 1, wherein said RF signal comprises a power identifying code that specifies at which power range the RF signal is transmitted.

19. The method as claimed in claim 18, further informing a member of the range of another member, by:
establishing the range by evaluating, after detecting, the power identifying code in the RF signal emitted by said another member,
displaying the range value to said member.

20. The method as claimed in claim 1, wherein said RF signal comprises an identifying code which identifies said members.

21. The method as claimed in claim 20, further comprising identifying said members when in said range while receiving said RF signal emitted by said members.

22. The method as claimed in claim 1, further comprising traveling in said territory at a speed and attention level corresponding to being without concerns of having a collision with another member of said group and then, once informed of said presence of other member in said range by said alarm, reducing speed and increasing attention level.

23. The method as claimed in claim 1, further comprising imposing fines and enforcement rules to said member of failure to transmit.

24. The method as claimed in claim 23, wherein comprising expelling from said territory said member for failure to transmit.

25. The method as claimed in claim 1, further comprising transmitting in said RF signal an information on the status of the member which is transmitting.

26. The method as claimed in claim 25, wherein transmitting said information on the status comprises choosing among a plurality of statuses having been predetermined.

27. The method as claimed in claim 25, wherein said information on the status comprises an alert signal indicating a danger status.

28. The method as claimed in claim 27, wherein said observing and determining further comprises localizing a member in danger with the help of receiving said alert signal.

29. The method as claimed in claim 1, further comprising:
observing the territory for detecting a presence of a target and monitoring a RF target signal transmitted by said target; and
determining if the alarm signal has been provided for the observed target.

30. The method as claimed in claim 29, further comprising notifying said target, in the case where it cannot be detected by another member in said range, of failure to transmit.

31. The method as claimed in claim 30, further comprising expelling said target from said territory for failure to transmit.

32. The method as claimed in claim 30, further comprising notifying members of the group of the presence of said target.

33. The method as claimed In claim 1 further comprising:
providing to at least one object located on said territory said means to transmit a RF signal such that said object is transmitting an object RF signal and said members can be informed of the presence of said at least one object in a pro-determined range while detecting said RF signal emitted by said at least one object.

34. The method as claimed in claim 33, wherein said object comprises a road signal indication.

35. The method as claimed in claim 33, wherein said object RF signal emitted by said at least one object comprises an identification code which identifies said at least one object.

36. The method as claimed in claim 35 further comprising identifying said at least one object when in said range while receiving said RF signal emitted by said at least one object.

37. The method as claimed in claim 33 further comprising transmitting in said RF signal emitted by said at least one object an information status.

38. The method as claimed in claim 37, wherein said information status comprises an alert signal indicating a danger status.

39. The method as claimed in claim 33 further comprising:
verifying that said at least one object located on said territory is transmitting said object RF signal by monitoring said object RF signal, therefore assuring that said group of members can be informed of the presence of said object.

* * * * *